United States Patent [19]

Julyan

[11] Patent Number: 5,790,610
[45] Date of Patent: Aug. 4, 1998

[54] DATA COMMUNICATION SYSTEMS

[75] Inventor: Jason B. E. Julyan, Bedford, United Kingdom

[73] Assignee: Texas Instruments Incorporated, Dallas, Tex.

[21] Appl. No.: 616,802

[22] Filed: Mar. 15, 1996

[30] Foreign Application Priority Data

Mar. 16, 1995 [GB] United Kingdom ............ 9505311

[51] Int. Cl.$^6$ .................................................. H04L 7/02
[52] U.S. Cl. ........................ 375/361; 375/340; 370/474
[58] Field of Search .............................. 375/340, 361, 375/362, 376; 370/474

[56] References Cited

U.S. PATENT DOCUMENTS

| | | | |
|---|---|---|---|
| 4,920,534 | 4/1990 | Adelmann et al. | 370/474 |
| 5,058,111 | 10/1991 | Kihara et al. | 370/474 |
| 5,249,185 | 9/1993 | Kanno et al. | 370/474 |
| 5,384,770 | 1/1995 | Mays et al. | 370/474 |
| 5,483,532 | 1/1996 | Eriksson | 370/474 |

*Primary Examiner*—Stephen Chin
*Assistant Examiner*—Bryan Webster
*Attorney, Agent, or Firm*—Richard L. Donaldson; William B. Kempler

[57] ABSTRACT

The present invention relates to a data communication system (12) which includes a receiver (14) capable of receiving serially transmitted signals and generates a receiver enabled signal and received data signal in response. A phase locked loop (16) generates a recovered clock signal in response to the received data signal and a first circuit (20) generates digitized data symbols in response to received data signals and the recovered clock signal. A nibble packetizer (28) forms data packets from the digitized data symbols and synchronizes transmission of the data packets in response to the receiver enabled signal, the digitized data symbols and the recovererd clock signal.

4 Claims, 4 Drawing Sheets

DATA COMMUNICATION SYSTEMS

FIELD OF THE INVENTION

The present invention relates to data communication systems and more particularly to a method and apparatus facilitating synchronisation of data transmission between networks operating at different transmission rates.

BACKGROUND OF THE INVENTION

ANSI/IEEE Standard 802.3u, published by the Institute of Electrical and Electronic Engineers, Inc., 345 East 45th Street, New York, N.Y. 10017 (hereinafter referred to as "IEEE 802.3u), provides a description of access method and physical layer specifications for a communications network access protocol referred to as Carrier Sense Multiple Access with Collision Detection (CSMA/CD). More particularly, IEEE 802.3u specifies Media Access Controller (MAC) parameters, physical layer, Medium Attachment Units (MAUs) and repeater for 100 megabits-per-second (Mbp/s) operation, referred to as 100BASE-T, on communications networks.

A Media Independent Interface (MII) interconnects the MAC sublayer and a Physical Medium Dependent (PMD) sublayer. The PMD is the portion of the physical layer which interfaces directly with the actual transmission medium. The IEEE 802.3u specification for the MII, which supports both 10 Mbp/s and 100 Mbp/s data rates, uses transmit and receive paths which are four bits wide, i.e. a 4-bit bus. Previous network MAC's and PMD's, however, were designed with only a 1-bit serial interface, one such example being the 100BASE-T predecessor, 10BASE-T, described in ANSI/IEEE Standard 802.3 (IEEE 802.3), also available from the Institute of Electrical and Electronic Engineers, Inc. for example, data transmitted from a 1-bit serial PMD is to be converted via an 100BASE-T MII interface for further transmission using the 4-bit bus, the MII interface must be operable to collect its serially received data into 4-bit packets (referred to as a "nibble"). This cannot be done simply by segmenting the incoming serial data into groups of 4 bits since the MII specification in IEEE 802.3u requires that the nibbles be synchronised to the transmitted or incoming data stream.

Data frame encoding for both IEEE 802.3u (referred to hereinafter as 100BASE-T) and IEEE 802.3 (referred to hereinafter as 10BASE-T) is identical. The first 8 octets (8-bit quantities) transmitted, which are collectively called Preamble, do not form part of the data payload of the frame. The first 7 octets of the Preamble each have a binary value of "10101010" (transmitted left to right). The last octet of the Preamble has a binary value of "10101011". The two adjacent "1" values in the last octet of the Preamble are called Start Frame Delimiter (SFD) and indicate to the receiving device that the transmission of data is about to commence.

The data is encoded for transmission into Manchester Code in which each binary digit is sent as two symbols. The symbols "10" are transmitted for binary 0. The symbols "01", are transmitted for binary 1. Using the Preamble of alternating 1's and 0's, the receiving device synchronises the phase of its Manchester Decoder to the phase of the incoming symbol stream.

The format of the Preamble, the alternating 1's and 0's, was developed for use with a serial PMD to MAC interface. When a serial PMD is to implement the 4-bit bus MII interface, however, a problem arises in that the data payload must be synchronised to the transmitted data octets. The Preamble, however, does not contain enough phase information for the PMD to make an accurate determination of synchronisation until the SFD is received.

The 100BASE-T MII specification show the format of the Preamble and the data payload sent in packets of 4 parallel bits over Receive Data (RXD) pins (4-bit receive data bus) to be:

| | | |
|---|---|---|
| RXD | [0]x1.11d0 d4 .X | Received data, where: |
| RXD | [1]x0.00d1 d5 .X | x = don't care |
| RXD | [2]x1.11d2 d6 .x | . = as before |
| RXD | [3]x0.01d3 d7 .x | |
| RXDV | 011111110 | Data Valid (1 = true) |

On initial reception of the Preamble, the PMD must synchronise so that it is sending a "1010" pattern on 4-bit receive data bus across the RXD pins. However, this synchronisation to the data may not be correct. The PMD may synchronise 180 degrees out of phase and still give the correct "1010" pattern.

There are several reasons why the PMD may synchronise out of phase. First, the 100BASE-T specification allows the PMD to receive up to 9 bits before the PMD starts sending the received data to the MAC. This allows the PMD to lock its Phase Locked Loop (PLL) onto the received analog data stream. As the PLL is locking onto the incoming data stream, the point at which it is sampling data is varying. Thus, it is quite likely that the PLL will sample the incoming data stream at a point near a transition where the logic level is ambiguous. On the other hand, when the PLL is locked onto the incoming data stream, the data is sampled at an optimum point which is half-way between two transitions.

Also, some PMD's use a signal qualification period where a certain sequence of rising and falling edges must be seen in the sampled signal before it is passed through as real data (the idea being to stop noise on the analog transmission line from erroneously being decoded and sent to the MAC).

SUMMARY OF THE INVENTION

The present invention provides a nibble packetizer architecture which synchronises data transmitted between a serial device and a device which receives its data across a multi-bit parallel bus.

Accordingly the present invention provides a data communications system comprising, a receiver for receiving serially transmitted signals and for generating a receiver enabled signal and received data signals in response, a phase locked loop responsive to said received data signals for generating a recovered clock signal, a first circuit responsive to said received data signals and said recovered clock signal for generating digitized data symbols from said received data signals, and a nibble packetizer responsive to said receiver enabled signal, said digitized data symbols and said recovered clock signal for forming data packets from said digitized data symbols and for synchronising transmission of said data packets to said received data signals.

In another aspect of the invention, a nibble packetizer architecture is provide which not only synchronises he data. transmission but also positions the location of double clock pulses on the receiving device so that the transmitted data is not affected.

According to a further aspect of the present invention there is provided a method for data communications comprising, receiving serially transmitted signals, generating a receiver enabled signal and received data signals in response to said serially transmitted signals, generating a recovered clock signal in response to said received data signals, generating digitized data symbols in response to said received data signals and said received data signals forming data packets from said digitized data symbols in response to said receiver enabled signal, said digitized data symbols and said recovered clock signal, and synchronising transmission of said data packets to said received data signals.

BRIEF DESCRIPTION OF THE DRAWINGS

For a better understanding of the present invention, reference may be made to the accompanying drawings, in which.

DETAILED DESCRIPTION OF THE INVENTION

Figure 1:
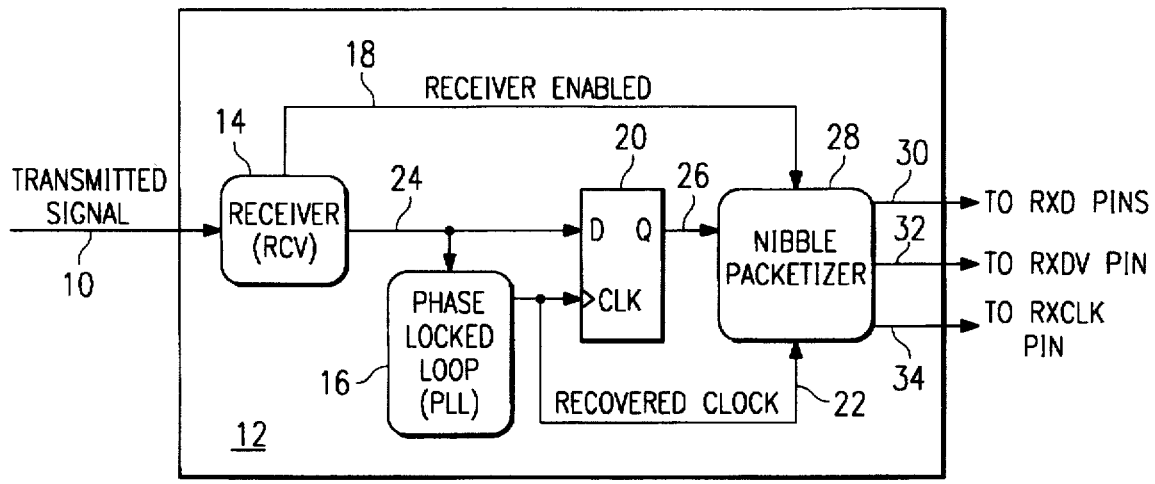
FIG. 1 illustrates a Physical Media Dependent device which includes a Nibble Packetizer circuit in accordance with the present invention.

In accordance with one embodiment of the present invention as shown in FIG. 1, a Physical Media Dependent (PMD) device 12 includes a Nibble Packetizer circuit 28 which is operable to generate 4-bit synchronised nibble packets from a transmitted input signal on Transmission (TX) Line 10 for transmission across a 4-bit bus 30 to a Media Access Controller (MAC), not shown, via a Media Independent Interface (MII), also not shown.

The inputs to the Nibble Packetizer circuit 28 are Sampled Symbols 26 recovered from Receiver (RCV) 14 by Phase Locked Loop (PLL) 16 and register 20; a Recovered Clock signal 22 from the PLL 16; and a Receiver Enabled signal 18 (also referred to as Carrier Sense, CRS, signal) which indicates that the Receiver 14 is receiving a modulated data signal on the Transmission (TX) Line 10.

Figure 2:
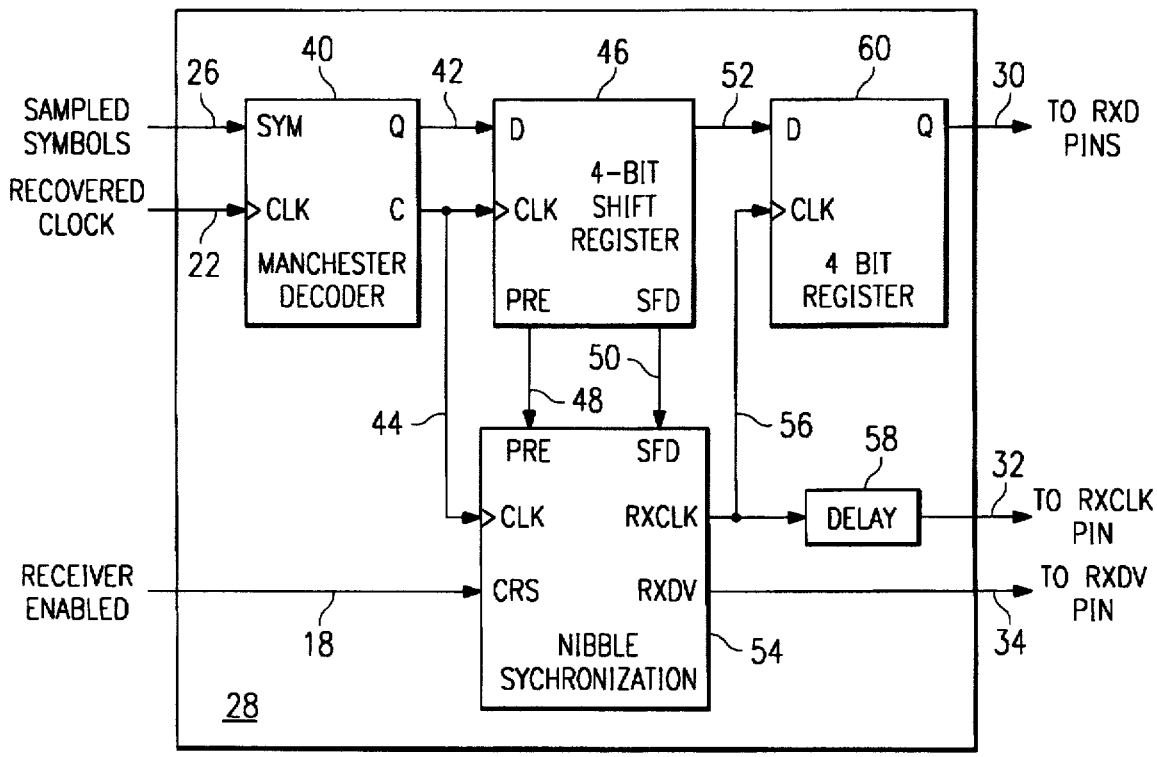
FIG. 2 depicts in detail a first embodiment of the Nibble Packetizer circuit included in FIG. 1.

The Nibble Packetizer circuit 28, as shown in more detail in FIG. 2, includes a Manchester Decoder circuit 40, a 4-bit Shift Register 54, a 4-bit Register 60, a Nibble Synchronisation circuit 54 and a Delay circuit 58.

Figure 3:
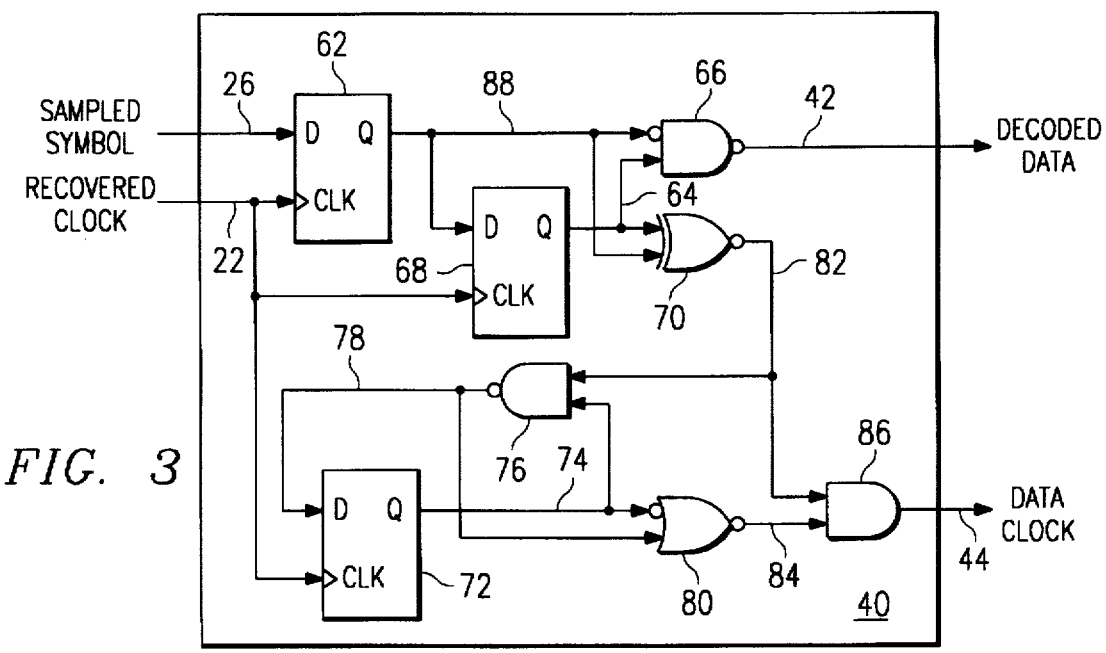
FIG. 3 shows in detail a Manchester Decoder circuit which is included in the Nibble Packetizer circuit shown in FIG. 2.

Initially, the Sampled Symbols 26 are decoded by the Manchester Decoder 40, shown in detail in FIG. 3. The Manchester Decoder 40 converts pairs of encoded symbols back into single binary digits. In other words, the Manchester Decoder 40 decodes the input sequence "10" to "0" and decodes the input sequence "01" to "1", to generate Decoded Data signal 42.

The Manchester Decoder 40 also produces a Data Clock signal 44 which is used by the other components of the Nibble Packetizer 28 and which, assuming rising edge triggered logic, gives a rising edge only when a new pair of symbols have been successfully decoded. In other words, if an erroneous pair of symbols are received ("11" or "00"), then no clock edge is produced and the Manchester Decoder 40 must re-synchronise to the symbol stream.

The Data Clock signal 44 generated by the Manchester Decoder 40 is input to the 4-bit Shift Register 46 to shift in each new bit of the Decoded Data 42. The 4-bit Shift Register 46 performs the serial to parallel conversion of the Decoded Data 42 is bit stream into nibbles. Two signals are asserted by the 4-bit Shift Register 46 in response to the bit stream. Whenever the 4-bit Shift Register 46 contains a complete nibble of the Preamble (the-pattern "1010"), a Preamble (PRE) signal 48 is asserted. Similarly, a Start Frame Delimiter (SFD) signal 50 is asserted whenever the 4-bit Shift Register 46 contains the SFD nibble (the pattern "1011").

The parallel nibble output 52 from the 4-bit Shift Register 46 is connected to a 4-bit Register file 60, the output 30 of which drives the RXD pins of the MII. The 4-bit Register file 60 stores the contents of the 4-bit Shift Register 46 when it receives a clock edge signal 56 from the Nibble Synchronisation circuit 54. This same clock edge signal 56 is delayed by Delay circuit 58 before driving the recovered clock signal 32 on the RXCLK pin on the MII. The delay is required to allow the values of the RXD pins to settle (the 100BASE-T MII specification states a minimum settling time of 10 nanoseconds (ns) for the RXD pins before driving the RXCLK pin).

Figure 4:
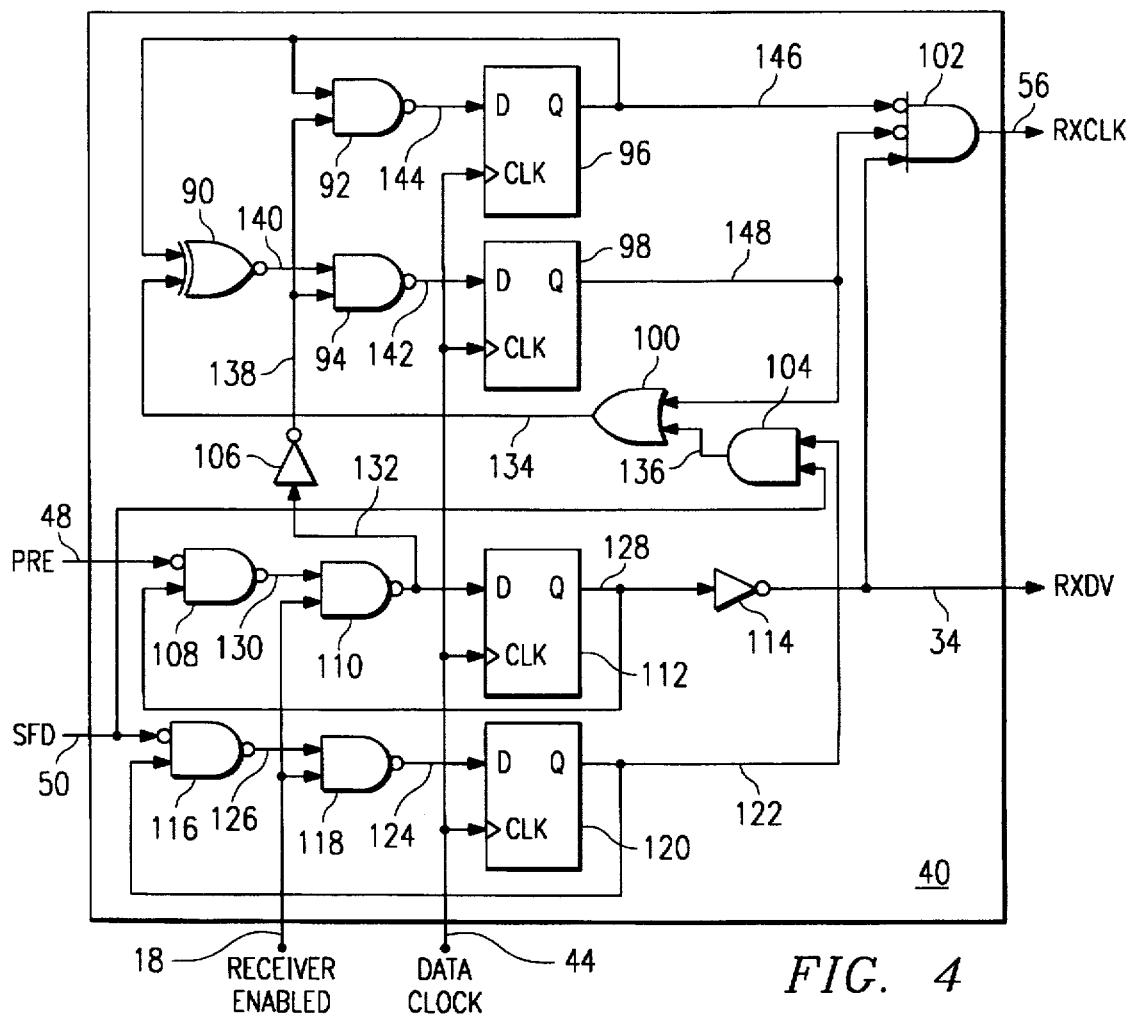
FIG. 4 illustrates in detail a Nibble Synchronisation circuit which is also included in the Nibble Packetizer circuit shown in FIG. 2.
Figure 5:
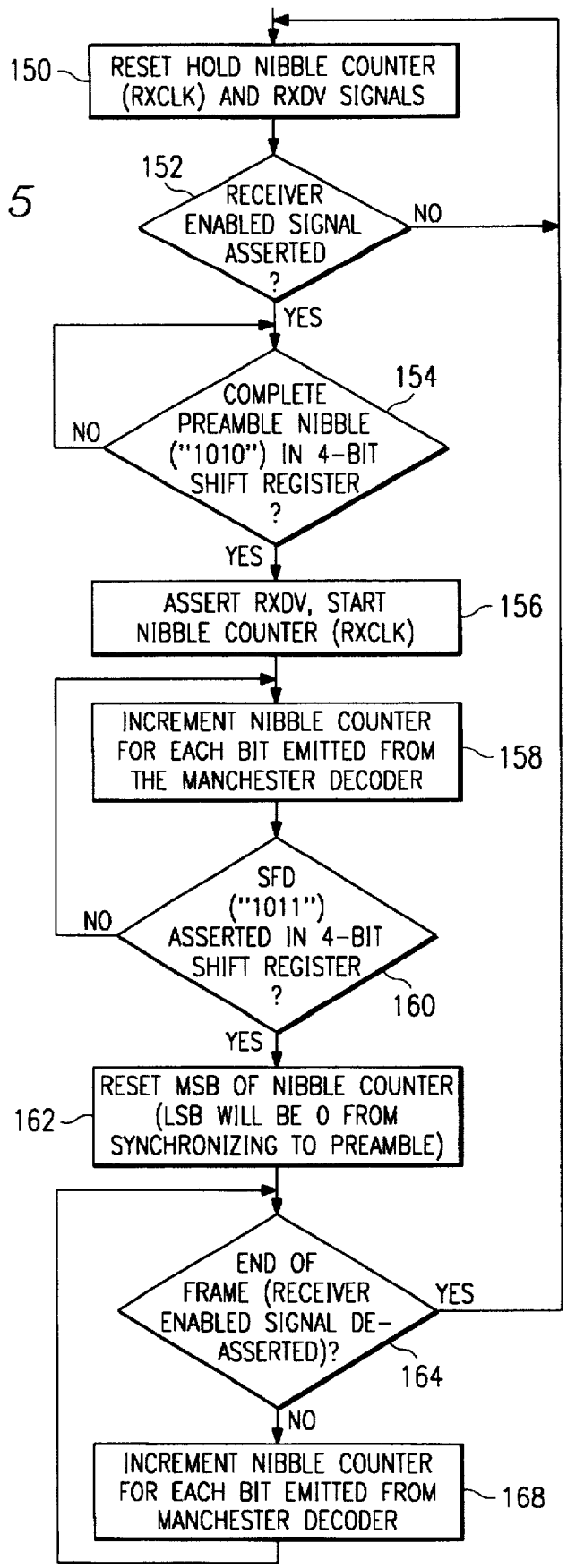
FIG. 5 is a flow diagram illustrating operation of the Nibble Synchronisation circuit shown in FIG. 4.

The Nibble Synchronisation circuit 54 which controls synchronisation of the nibble output 52 of the Decoded Data 42 on the RXD pins is shown in detail in FIG. 4. The sequence of events performed by the Nibble Synchronisation circuit 54 are shown in the flowchart in FIG. 5.

First, at block 150, a nibble counter, which drives the clock edge signal, 56 which in turn drives the RXCLK pin, and a signal 34 which drives the RXDV pin are reset. If, as determined at decision block 152, the receiver enabled signal 18 is asserted, then the Nibble Synchronisation circuit 54 determines, at decision block 154, whether a complete Preamble nibble ("1010") is in the 4-bit Shift Register circuit 46 (i.e. whether the PRE signal 48 has been asserted). If, at decision block 154, the complete Preamble nibble is detected, as shown at block 156i the Nibble Synchronisation circuit 54 then asserts the signal 34 on the RXDV pin and resets the nibble counter which drives the clock edge signal 56 which in turn drives the RXCLK pin.

The nibble counter is incremented as indicated at block 158, for each Decoded Data bit 42 emitted from the Manchester Decoder 40 until, as determined at decision block 160, the Nibble Synchronisation circuit 54 detects assertion of the SFD signal 50 by the 4-bit Shift Register 46. Once the SFD signal 50 has been asserted, the Nibble Synchronisation circuit 54 resets the most significant bit (MSB) of the nibble counter, as indicated at block 162. The least significant bit (LSB) of the nibble counter will be zero from synchronisation to the Preamble.

The Nibble Synchronisation circuit 54 then increments the nibble counter, at block 168 until, at decision block 164, the end of the frame is detected (i.e. the receiver enabled signal 18 is de-asserted).

The Nibble Synchronisation circuit 54 shown in FIG. 4, however, includes a deficiency. If the data stream is 180 degrees out of phase when the SFD signal 50, which indicates that the SFD nibble has been detected by the 4-bit Shift Register 46, is asserted by the 4-bit Shift Register 46, then the delayed signal 32 transmitted on the RXCLK pin has a double clock pulse.

Figure 6:
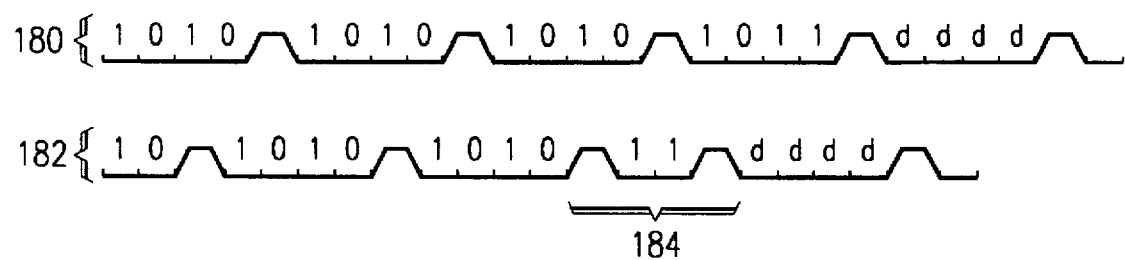
FIG. 6 depicts a timing diagram illustrating synchronised and non-synchronised nibbles and the resulting clock pulses generated by the Nibble Synchronisation circuit shown in FIG. 4.

The double clock pulse on the delayed output signal 32 and transmitted on the RXCLK pin is illustrated in the timing diagrams shown in FIG. 6. The first timing diagram, at 180, shows the delayed output signal 32 on the RXCLK pin when each nibble transmitted on the RXD pins is in phase with the Decoded Data signal 42. The second timing diagram, at 182, illustrates the delayed output signal 32 on the RXCLK pin when the nibbles transmitted on the RXD pins are out of phase with the Decoded Data signal 42. The resulting double clock pulse is shown in FIG. 6 at 184.

The MII RXCLK speed is specified to be 25 MHz for 100-BASE-T and 2.5 MHz for 10BASE-T. The resulting double clock pulse in FIG. 6 at 184 is thus operating at a 5 MHz cycle. The MII equipped MAC should be able to support this single 5 MHz cycle correctly without modification.

Figure 7:
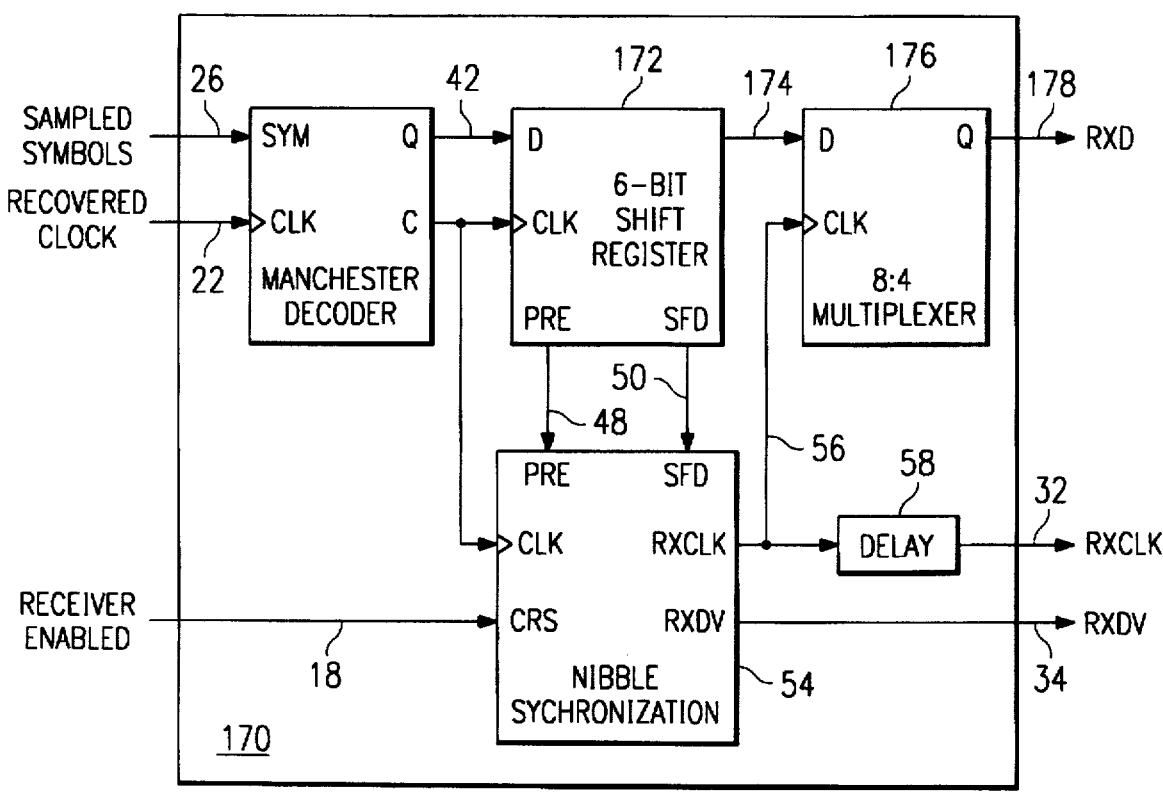
FIG. 7 shows a second embodiment of the Nibble Packetizer circuit included in FIG. 1.

To eliminate the double clock pulse, the Nibble Packetizer circuit 28 architecture shown in FIG. 2 is modified, as shown in the Modified Nibble Packetizer circuit 170 in FIG. 7, to produce a constant 2.5 MHz clock. First, the 4-bit Shift Register 46 shown in FIG. 2 is replaced by a 6-bit Shift Register 172 as shown in FIG. 7. The output 30 on the RXD pins is still a 4-bit bus. The 4-bits are selected, however, using an 8:4 Multiplexer 176. The 8:4 Multiplexer 176 selects either the first 4 bits or the last 4 bits of a 6-bit output 174 from the 6-bit Shift Register 172. The control signal 56 for the 8:4 Multiplexer 176 is derived from the Nibble Synchronisation circuit 54, which is unmodified from that shown in FIG. 2.

Initially the 8:4 Multiplexer 176 selects the first 4 bits of the 6-bit output 174 from the 6-bit Shift Register 172. The nibble counter in the Nibble Synchronisation circuit 54 is set accordingly. If the nibble counter is not 113", but is "1" when the SFD signal 50 is detected by the Nibble Synchroniser circuit 54, then the nibble counter is not reset. Instead, the 8:4 Multiplexer 176 selects the last 4-bits from the output 174 from the 6-bit Shift Register 172. This action delays the input data by 2 bit times so that no double pulse is seen on the delayed output signal 32 on the RXCLK pin.

At this point, however, another problem is introduced in that an extra 2 shifts of the 6-bit Shift Register 172 are required at the end of the frame to make up for the 2 bit times of delay caused by the processing of the 8:4 Multiplexer 176. Since the Modified Nibble Packetizer 170 is clocked by arrival of data, a clock source not related to data or data arrival is required or, at the end of a frame, the 8:4 Multiplexer 176 is programmed to clock out the first 4-bits of the 6-bit Shift Register 172.

If a clock source not related to data or to data arrival is employed, it must be substituted for the recovered clock when the Receiver Enabled signal is de-asserted. This will then provide the additional two clock edges required to shift the final nibble to occupy the last 4 bits of the 6-bit Shift Register 172 and produce the final RXCLK edge. This independent clock source must be synchronised by some mechanism to the recovered clock in order that the final RXCLK edge is spaced 400 ns (a 2.5 MHz cycle) from the penultimate edge.

Thus, since the double clock pulse on the delayed RXCLK pin 32 cannot be avoided, the location of a possible double pulse on the delayed output signal 32 on the RXCLK pin is chosen to be upon reception of the SFD signal 50 since at this time the MAC is simply discarding the Preamble and waiting to detect "1011", the SFD, on the RXD pins. Only after this point is any processing of the data required so a single 5 MHz cycle merely changes the MAC from a "Waiting-for-SFD" state to a "Process-First-Octet" state.

Consequently, the MAC state "Process-First-Octet" indicates the start of the processing of the data in the frame. The Preamble is provided so that the receiving device has a regular pattern of rising and falling edges onto which it can lock its phase locked loop data recovery circuit. But at this point, the Modified Nibble Packetizer circuit 170 has already aligned the outgoing parallel nibble data 176 on the RXD pins to the incoming received signal data at 42. Thus, the rest of the frame passes through the serial-to-parallel conversion performed by the 4-bit Shift Register 46 with no further alteration of the synchronisation parameters.

What is claimed is:

1. A data communications system comprising:
   a receiver for receiving serially transmitted signals and for generating a receiver enabled signal and received data signals in response;
   phase locked loop responsive to said received data sill for generating a recovered clock signal;
   a first circuit responsive to said received data signals and said recovered clock signal for generating digitized data symbols from said received data signals; and
   a nibble packetizer responsive to said receiver enabled signal, said digitized data symbols and said recovered clock signal for forming data packets from said digitized data symbols and for synchronizing transmission of said data packets to said received data signals, wherein said nibble packetizer includes a Manchester decoder, responsive to said recovered signal and said digitized data symbols for decoding said digitized data symbols to generate decoded data symbols and a data clock signal, a four bit shift register responsive to said Manchester decoder for converting said decoded data symbols into parallel data and wherein said four bit shift register is operable to generate a preamble signal upon receiving a first sequence of said decoded data symbols.

2. The system of claim 1 wherein said four bit shift register is operable to generate a start frame delimiter signal upon receiving a second sequence of said decoded data symbols.

3. The system of claim 2 wherein said nibble packetizer further includes a nibble synchroniser responsive to said receiver enabled signal, said data click signal, said preamble signal and said start frame delimiter signal for generating a synchronising click signal, said synchronising click signal operable to synchronise transmission of said parallel data to said received data signals.

4. The system of claim 3 further wherein said nibble packetizer further includes a second register for storing said parallel data and for transmitting said parallel data I response to said synchronising clock signal.

* * * * *